United States Patent [19]

Barrett et al.

[11] 4,077,719
[45] Mar. 7, 1978

[54] CONTINUOUS WAVE GENERATION OF COHERENT VIBRATIONAL ANTI-STOKES SPECTRA

[75] Inventors: Joseph J. Barrett, Morris Plains; Richard F. Begley, Boonton, both of N.J.

[73] Assignee: Allied Chemical Corporation, Morris Township, N.J.

[21] Appl. No.: 753,028

[22] Filed: Dec. 22, 1976

Related U.S. Application Data

[63] Continuation of Ser. No. 569,893, Apr. 21, 1975 abandoned.

[51] Int. Cl.² .............................................. G01J 3/44
[52] U.S. Cl. .................................. 356/75; 356/106 S
[58] Field of Search ....................... 356/75; 331/94.5 L

[56] References Cited

U.S. PATENT DOCUMENTS

| 3,563,656 | 2/1971 | Helms | 356/100 X |
| 3,913,033 | 10/1975 | Tuccio et al. | 331/94.5 L |

OTHER PUBLICATIONS

Wynne, IBM Technical Disclosure Bulletin, vol. 15, No. 5, Oct. 1972, pp. 1469 and 1470.
Moore et al., Analytical Chemistry, vol. 45, No. 12, Oct. 1973, pp. 2009-2014.

*Primary Examiner*—F. L. Evans
*Attorney, Agent, or Firm*—Ernest D. Buff

[57] ABSTRACT

A method and apparatus for spectroscopic material analysis are provided. Two coherent, continuous beams of monochromatic radiation are directed through a sample of material. A tuning mechanism adjusts the frequency difference between the radiation beams to equal substantially the vibrational frequency of a preselected constituent of the material. Radiation scattered by the material is received by a filtering mechanism adapted to transmit selectively an anti-Stokes signal generated coherently during scattering. The signal is received by a detecting mechanism which indicates the intensity thereof.

16 Claims, 3 Drawing Figures

CONTINUOUS WAVE GENERATION OF COHERENT VIBRATIONAL ANTI-STOKES SPECTRA

This is a continuation of application Ser. No. 569,893, filed Apr. 21, 1975 now abandoned.

BACKGROUND OF THE INVENTION

This invention relates to the field of spectroscopy and more particularly to a method and apparatus in which two coherent, continuous beams of monochromatic light are transmitted through a sample of material at a frequency differential correlated with the vibrational frequency of a constituent to detect and quantitatively measure the constituent.

DESCRIPTION OF THE PRIOR ART

In prior art apparatus used for spectroscopic material analysis, scattered light produced by exciting quanta from a pulsed radiation source at a frequency differential close to the vibrational frequency of the material is directed through a filtering mechanism adapted to selectively transmit an anti-Stokes component generated coherently during scattering. The output of the filtering mechanism is converted to a detectable signal and displayed.

One of the major problems with such apparatus is the difficulty of analyzing mixtures of materials to measure quantitatively materials present in minute amounts. The output signal from the filtering mechanism is frequently altered or obscured by background interference resulting from the non-resonant susceptibility of materials coexistent with the material being analyzed. The problem is particularly troublesome when the material being analyzed is monitored continuously for substantial periods of time. To alleviate such problems, it has been necessary to provide the apparatus with costly maintenance standards adapted to prevent frequency and amplitude instability of the radiation source and to equip it with highly sensitive forms and combinations of detectors, pulsed radiation sources, filters, control systems and the like, which are relatively expensive.

SUMMARY OF THE INVENTION

The present invention provides an economical, accurate apparatus for spectroscopic material analysis. The apparatus has radiation source means for generating two coherent, continuous beams of monochromatic radiation. Such radiation source means has a tuning means associated therewith for adjusting the frequency difference between said beams of radiation to equal substantially the vibrational frequency of a preselected constituent of gaseous material. A projecting means is provided for directing the beams of radiation through the material to produce scattered radiation that contains a detectable signal composed of an anti-Stokes component generated coherently during scattering. A filtering means, adapted to receive the scattered radiation, selectively transmits the signal to a detecting means, which indicates the intensity thereof.

Further, the invention provides a method for spectroscopically analyzing material comprising the steps of generating two coherent, continuous beams of monochromatic radiation; adjusting the frequency difference between the beams of radiation to equal substantially the vibrational frequency of a preselected constituent of material; directing the beams of radiation through the material to produce scattered radiation that contains a detectable signal composed of an anti-Stokes component generated coherently during scattering; filtering the scattered radiation to selectively transmit the detectable signal; and indicating the intensity of the signal.

Several known tuning means may be adapted for use with the above apparatus. Preferably, the tuning means comprises a pair of high resolution diffraction gratings adjusted to transmit the two monochromatic light beams at a frequency differential correlated with the vibrational frequency of a species of the material. This condition is obtained when $$2\omega_1 - \omega_2 = \omega_3 \quad \text{and} \quad \omega_1 - \omega_2 = \omega_3 - \omega_1 = \omega_V,$$

where $\omega_1$ and $\omega_2$ represent, respectively, the frequencies of the two coherent, continuous beams of monochromatic radiation, $\omega_3$ is the frequency of the coherently generated anti-Stokes component and $\omega_V$ is the vibrational frequency of the molecular species. For a given species, the rotational spectra exist at a unique set of frequencies. Each of these spectra can be resonantly enhanced to produce an anti-Stokes rotational component of significantly increased intensity. Identification of the species having a particular set of vibrational spectra is made positively when resonant enhancement is detected for an anti-Stokes component corresponding to at least one vibrational spectral component of the species.

The frequency and amplitude stabilities of a continuous wave radiation source are greater than those of pulsed radiation sources. Hence, a closer correlation exists between the quantity of material being analyzed and the intensity of vibrational anti-Stokes components produced by continuous wave generation. Due to the superior stability of a continuous wave radiation source, signal collection efficiencies are far greater than ordinarily expected for the low input power employed thereby. Accordingly, the accuracy and reliability of the apparatus are far greater than that obtained by apparatus wherein the exciting quanta are produced by a pulsed radiation source.

BRIEF DESCRIPTION OF THE DRAWINGS

The invention will more fully understood and further advantages will become apparent when reference is made to the following detailed description of the preferred embodiments of the invention and the accompanying drawings in which.

DESCRIPTION OF THE PREFERRED EMBODIMENTS

Radiation carrying vibrational spectra are found in each of the visible, infrared and ultraviolet frequency regions. As a consequence, the invention will function with radiation having a relatively wide range of frequencies. For illustrative purposes, the invention is described in connection with method and apparatus for measuring vibrational spectra of gaseous material scattered by radiation from the visible frequency region. When applied in this manner, the invention is particularly suited to detect and to measure quantitatively minor constituents of a gaseous material such as air. It will be readily appreciated that the invention can be practiced using radiation from any of the foregoing frequency regions, and that it can be employed for similar and yet diversified uses, such as the analysis of vibrational spectra of liquids and solids the determination of molecular gas constants and the like.

Figure 1:
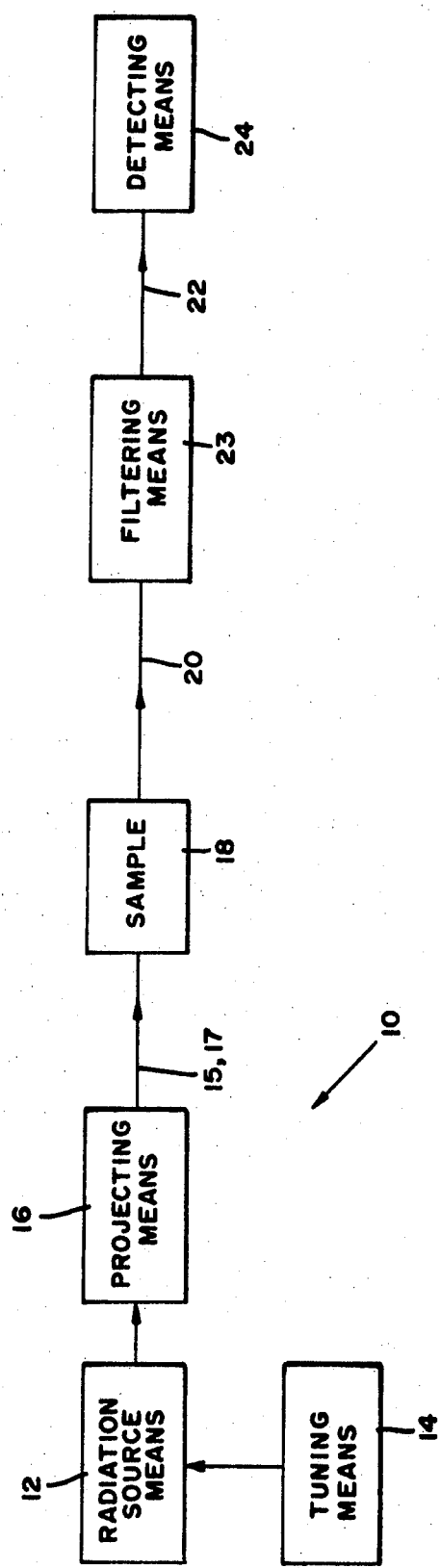
FIG. 1 is a block diagram showing apparatus for spectroscopic gas analysis.

Referring to FIG. 1 of the drawings, there is shown preferred apparatus for spectroscopic gas analysis. The apparatus, shown generally at 10, has radiation source means 12 for generating two coherent, continuous beams 15, 17 of monochromatic radiation. The radiation source means 12 has associated therewith a tuning means 14 for adjusting the frequency difference between the beams of radiation to equal substantially the vibrational frequency of a preselected constituent of material. A projecting means 16 is provided for directing the beams of radiation 15, 17 through gaseous material in compartment 18 to produce scattered radiation 20 that contains a detectable signal 22 composed of an anti-Stokes component generated coherently during scattering. A filtering means 23 is adapted to receive the scattered radiation from compartment 18. The filtering means selectively separates the signal 22 from the scattered radiation and transmits the signal 22 to a detecting means 24 which indicates the intensity thereof.

Figure 2:
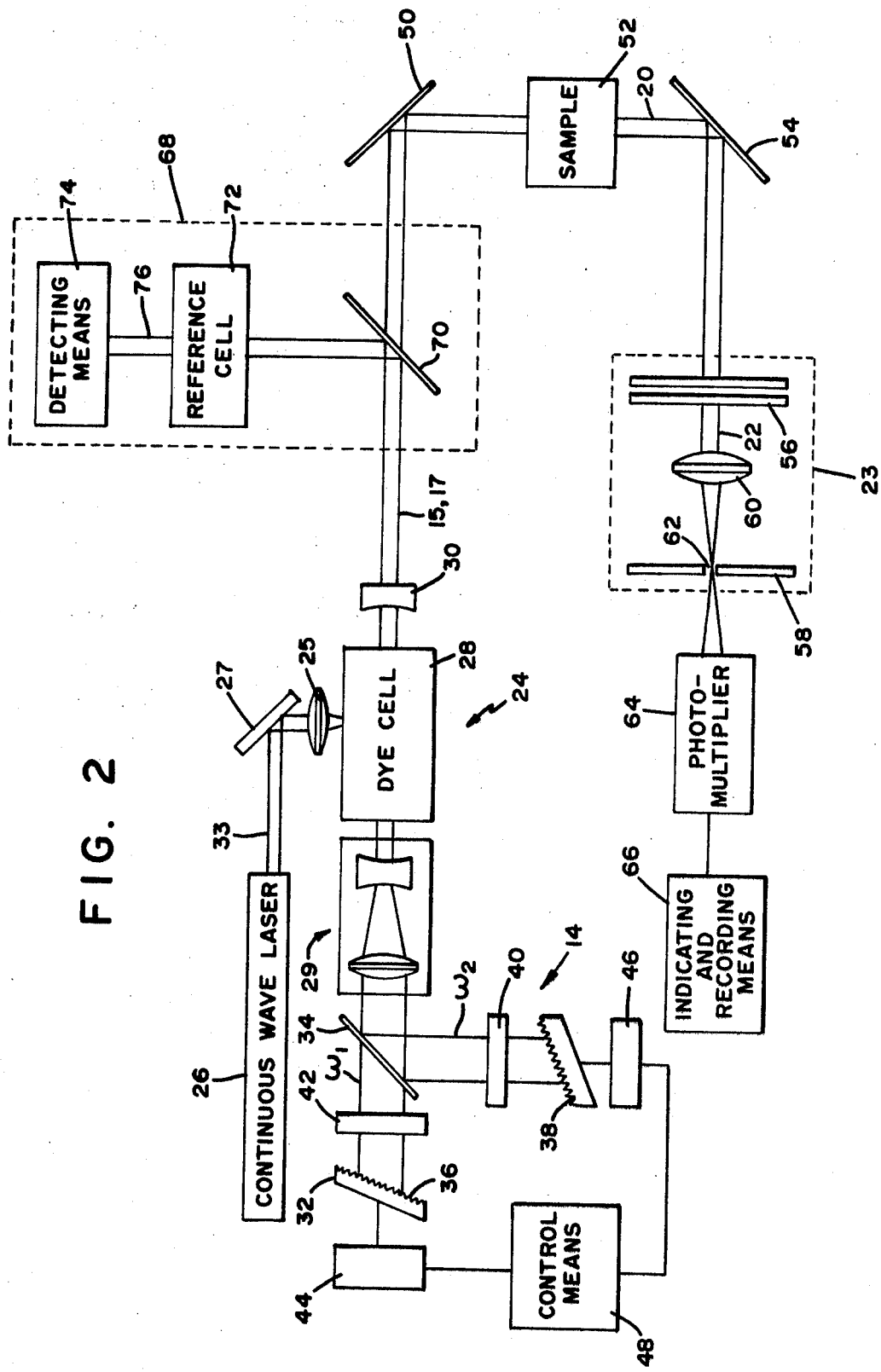
FIG. 2 is a schematic diagram of the apparatus of FIG. 1.

More specifically, as shown in FIG. 2, the radition source means 12 can comprise a dye laser shown generally at 24 adapted to be excited by energy from continuous wave laser 26, which may be a continuous wave krypton laser, a continuous wave argon-ion laser, ruby laser or the like. Such dye laser 24 includes (1) a cell 28 containing dye material and (2) a laser cavity comprised of a partially transmitting output mirror 30 and an optical element 32 for generating laser radiation. In addition, the dye laser 24 can include a lens 25 and mirror 27 for directing a continuous wave of radiation 33 into cell 28. The dye materials which are suitable for use in the dye laser 24 are any of those conventionally employed which, when excited, emit light having frequencies in the transparency range of the gaseous material being analyzed. Typical dye materials include Rhodamine gG, Kiton Red, Cresyl Violet, Nile Blue and the like.

Radiation emitted from the dye material in dye cell 28 is continuously tunable over a wide frequency range. A tuning means 14 associated with the dye cavity 24 separates the radiation into a pair of coherent beams of monochromatic radiation $\omega_1$, $\omega_2$, which are transmitted from the radiation source means 12 via output mirror 30. Generation of the detectable signal 22 is most efficient when the radiation emitted from the dye laser 24 has a line width and frequency stability about equal to or less than the line width of the vibrational spectra of the material appointed for detection.

The tuning means can include a varying number of optical components asembled in a variety of combinations. In one embodiment of the apparatus 10, the tuning means 14 comprises a beam splitting means 34 for separating radiation from dye cell 28 into a pair of radiation beams, $\omega_1$, $\omega_2$ and a pair of diffraction gratings 36, 38 mounted in autocollimation. The two diffraction gratings 36, 38 function in the manner of a conventional back mirror and, in addition, restrict the frequency range of the radiation beams so as to produce within cavity 24 a pair of coherent beams of monochromatic radiation having narrow line widths. A beam expanding telescope 29 can, optionally, be disposed in series with and between dye cell 28 and beam splitting means 34 for enlarging the width of the beams and improving the efficiency of the gratings. The tuning means 14 can additionally comprise a pair of etalons 40, 42, disposed in series with and between the beam splitting means 34 and diffraction gratings 36, 38, for further restricting the frequency of the radiation beams. Diffraction gratings 36, 38 are connected through shaft encoded stepping motors 44, 46 to a control means 48 adapted to vary the rotational velocity of stepping motor 44 relative to the rotational velocity of stepping motor 46. Radiation beams $\omega_1$, $\omega_2$ are tuned by rotating the diffraction gratings 36, 38 corresponding thereto so that the frequency difference therebetween equals substantially the vibrational frequency of a preselected constituent of gaseous material.

The control means 48 is preferably adjusted so that the frequency scanning rate of diffraction grating 36 is twice that of diffraction grating 38. This adjustment of the control means 48 permits generation of a detectable signal 22 having a substantially constant frequency. A single narrow band pass filter 56 can thus be used to reject unwanted radiation produced during scattering and selectively transmit the detectable signal 22.

A projecting means comprising mirror 50 is associated with the dye laser 24. The projecting means introduces the two coherent, continuous beams of monochromatic radiation 15, 17 into gaseous material in sample compartment 52 in one direction, which will be considered to be substantially vertical for convenience in referencing directions but may, of course, be in any direction desired. Raman scattered radiation 20 from the gaseous material in sample compartment 52 is transmitted via mirror 54 to the filtering means 23.

Several known filtering means may be used with the apparatus 10. Preferably, the filtering means 23 is a narrow band pass interference filter 56 adapted to receive the scattered light 20 from sample 52. In addition, the filtering means includes a lens 60 and a pinhole stop 58 which cooperate to effect separation of the detectable signal 22 from the scattered radiation 20. The latter includes radiation beams 15 and 17, together with an anti-Stokes beam which is generated coherently during scattering. Interference filter 56 is constructed to transmit radiation within a narrow frequency range centered at the frequency of the anti-Stokes signal 22.

Before describing how the apparatus of FIG. 2 can be used to determine the intensity of signal 22, it would be helpful to explain the principles underlying generation of coherent, continuous vibrational anti-Stokes spectra.

When two light beams at $\omega_1$ and $\omega_2$ are incident on a non-linear material, coherent emission at $2\omega_1 - \omega_2$ is generated through the third-order nonlinear polarization. The third-order nonlinear susceptibility $\chi^{(3)}$ associated with this polarization is responsible for the emission. $\chi^{(3)}$ is composed of two basic parts, $\chi_{nr}^{(3)}$ a nonresonant part that gives rise to constant background signal and a resonant part $\chi_r^{(3)}$ that contains resonant denominators that show large enhancement at $2\omega_1 - \omega_2$ when $\omega_1 - \omega_2 = \omega_v$ and when $\omega_1$ or $\omega_3$ approach an electronic resonance in the material (similar to the resonance Raman effect). At the peak of the Raman resonance, $\chi_r^{(3)}$, which is normally a sum of real and complex parts, reduces to the complex component that is related to the differential Raman cross section by the following equation $$\chi''R = \frac{\pi c^4}{n\omega_1\omega_2^3 \Gamma_R}\left(\frac{d\sigma}{d\Omega}\right)$$

where $\Gamma_R$ is the normal Raman line width (*hwhm*) and $d\sigma/d\Omega$ is the usual spontaneous Raman differential cross section.

The conversion efficiency to the anti-Stokes is given by the equation.

$$\epsilon = \frac{P(\omega_3)}{P(\omega_2)} \propto \frac{\omega_3^2}{n^4} |N_\chi^{(3)}|^2 l_{coh}^2 \left(\frac{P(\omega_1)}{A}\right)^2$$

where $n$ is the refractive index; $N$ is the molecular number density; $Z_{coh}$ is the coherence length or the distance over which colinear beams slip out of phase by $\pi$ radians.

The detectable signal 22 from interference filter 56 is focused in the plane of pinhole stop 58 by a lens 60. Lens 60 is adjusted so that the center of the signal 22 is positioned on the pinhole 62. The intensity of the portion of signal 22 passing through the pinhole 62 is detected by a photomultiplier 64. The output of the filtering means 23, representing signal 22, is displayed by an indicating and recording means 66, which can comprise an oscilloscope and a chart recorder.

The material which can be analyzed by the method and apparatus of the present invention comprise any gas, liquid or solid that is transparent to radiation frequencies over some portion of the infrared, visible or ultraviolet frequency range. Virtually all gases and numerous liquids and solids are transparent to such radiation frequencies. Typical liquids exhibiting the required transparency to such radiation frequencies comprise: carbon disulfide, benzene, water, alcohol, carbon tetrachloride, trimethylene chloride, cineole, hexahydrophenal, decahydroaphthalene, isoamylphthalate, pentachloroethane, trimethylene bromide, chlorobenzene, nitrotoluene, aniline, bromoform, methylene iodide, gasoline, kerosine, vegetable oils, wine, soda and alcoholic beverages, blood plasma, urine and the like. Representative solids which exhibit the required transparency to such radiation frequencies comprise ammonium di-hydrogen phosphate, potassium di-hydrogen phosphate, borosilicate glass, quartz, fused silica, gallium phosphide, calcium aluminate glass, calcite, rutile, sapphire, strontium titanate, lead sulfide, magnesium fluoride, lithium fluoride, calcium fluoride, arsenic trisulfide glass, indium phosphate, gallium arsenic, silicon, sodium fluoride, cadmium sulfide, cadmium telluride, selenium, germanium, sodium chloride, silver chloride, potassium chloride, potassium bromide, diamond and the like.

Coherent, continuous wave (*cw*), anti-Stokes Raman scattering has been observed using a fixed frequency pump beam (at an argon laser wavelength 514.53 nm) and a tunable frequency Stokes beam (provided by a *cw* dye laser at 615.41 nm) focused in a cell containing one atmosphere of methane gas.

The *cw* dye laser, which was pumped collinearly by an argon ion laser, consisted of a folded, six-mirror, astigmatically compensated resonator. The total length of the *cw* dye laser optical cavity was 1.8 m. A free-flowing jet stream of rhodamine 6G dye in ethylene glycol was pumped with the 514.53 nm argon laser line. The 514.53 nm beam entered the dye laser cavity through a multilayer dielectric mirror which had high transmissivity over the range of 470–530 nm and high reflectivity over the range of 560–650 nm. A pair of 30-cm-radius mirrors in the dye laser cavity was used to produce a focus in a gas cell with Brewster angle windows containing one atmosphere of methane. All of the mirrors of the dye laser cavity had high reflectivity over the range 560–650 nm.

The above experiment utilized the $\nu_1$ symmetric vibrational mode in methane at 2916.7 cm$^{-1}$. When the dye laser was tuned to 605.41 nm, coherent anti-Stokes radiation at 447.37 nm was generated and transmitted by the second 30-cm-radius mirror which had high transmissivity at 447.37 nm and high reflectivity at 514.53 nm and 605.41 nm. It was filtered using a narrow-band-pass interference filter centered at 447.37 nm and a Corning glass 5-58 filter. The detector was a cooled RCA 8850 photomultiplier tube operated in the pulse counting mode.

Wavelength selection in the dye laser cavity was accomplished by use of a prism for coarse tuning and a thin solid etalon for fine tuning. The prism-etalon combination produced a single-frequency dye laser line with a width of about 0.1 cm$^{-1}$. Fine tuning of the dye laser wavelength in the vicinity of 605.4 nm was accomplished by rotation of the solid etalon. A 1-m focal-length Czerny-Turner spectrometer was set to monitor the Stokes signal at 605.41 nm.

The power measured in the 514.53 nm pump beam was 0.46 W and the effective power in the Stokes beam was calculated to be about 36 mW. Using equations (1–3), the power of the coherent anti-Stokes signal produced by scattering from the $\omega_1$ vibrational mode in methane was calculated to be $2.18 \times 10^{-13}$ W corresponding to $4.90 \times 10^5$ photons/sec. which is in good agreement with the experimentally observed value of $5.72 \times 10^5$ photons/sec.

The apparatus 10 which has been described herein can, of course, be modified in numerous ways without departing from the scope of the invention. For example, the filtering means 23 can comprise the combination of fixed etalon tuned by controlling the temperature thereof and a narrow band pass interference filter having its pass band centered at the frequency of the anti-Stokes signal 22. One type of fixed etalon which is suitable is comprised of optically transparent material, such as fused silica, having opposed surfaces which are polished, flat, parallel and coated with silver, dielectric material or the like for high reflectivity at a preselected frequency region. The thickness of the etalon used in the filtering means 23 can be chosen so that the spectral range of the etalon is equal to or greater than the full width of half transmission points of the narrow band pass interference filter. Fine tuning of the solid etalon used in the filtering means is affected by providing means for controlling the temperature, and hence the optical path length, thereof so as to cause the transmission peak for an order to be centered at the frequency of the anti-Stokes component of signal 22. Such solid etalon preferably has a finesse chosen so that the full width at half transmission points thereof is substantially equal to the spectral width of the anti-Stokes signal 22. The tuning means can be comprised of a single diffraction grating adapted to generate first and second beams $\omega_1$, $\omega_2$ of monochromatic radiation, the second beam $\omega_1$ being derived from the second order of the grating and having its frequency tuned at twice the rate of the first beam. An acoustic-optic modulator can be disposed in series with and between telescope 29 and diffraction grating 38 to effect electronic generation of the radiation beams $\omega_1$, $\omega_2$.

Figure 3:
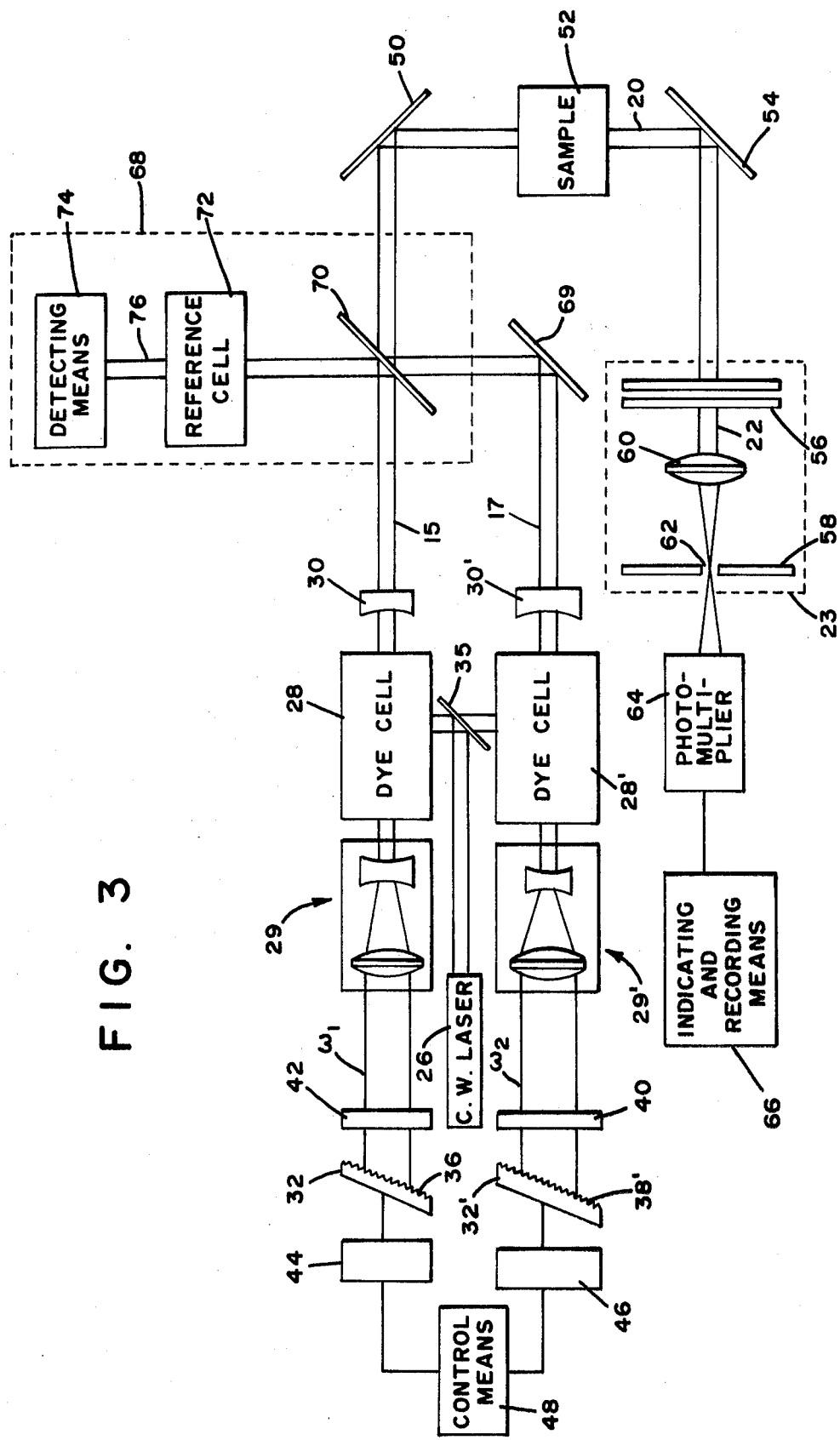
FIG. 3 is a schematic diagram showing an alternate embodiment of the apparatus of FIG. 1.

As shown in FIG. 3, dye laser 24 may comprise a plurality of cells 28, 28' adapted to be excited by energy from continuous wave laser 26, the first cell 28 being constructed in the aforementioned manner and the second cell 28' being comprised of a partially transmitting output mirror 30' and an optical element 32' including grating 38', for generating laser radiation. A beam expanding telescope 29' can, optionally, be disposed in series with and between the dye cell 28' and etalon 40' for improving the efficiency of grating 38'. Radiation from continuous wave laser 26 is directed through dye material in dye cells 28, 28' by beam splitting means 35. Each of the cells 28, 28' can be provided with a dye material which, when excited, emits radiation having frequencies within the transparency range of the material being analyzed, the dye material of the second cell 28' being further adapted to emit frequencies which overlap vibrational stokes spectra produced when the material being analyzed is scattered with the frequencies emitted from dye cell 28. Radiation from dye cell 28' and partially transmitting output mirror 30' is directed by mirror 69 to beam splitting means 70 and, optionally, a calibrating means as hereinafter described.

A calibrating means shown generally at 68 including beam splitting means 70, reference gas cell 72 and detecting and recording means 74 can, optionally, be associated with the apparatus 10 for providing a reference anti-Stokes signal 76 derived from a reference material of the type being analyzed. The beam splitting means 70 is adapted to direct a portion of radiation beams 15, 17 through the reference material, which is contained in cell 72. Scattered radiation produced in reference material cell 72 is processed by detecting means 74, which is constructed and operated in the same manner as detecting means 24. The output of the detecting means 74 represents the magnitude of the reference anti-Stokes signal 76 for a known concentration of reference material. Such output signal can be compared with the output signal of detecting means 24 to determine the concentration of material in sample compartment 52.

Other similar modifications can be made which fall within the scope of the present invention. It is, accordingly, intended that all matter contained in the above description and shown in the accompanying drawings be interpreted as illustrative and not in a limiting sense.

In operation of the preferred apparatus, radiation source means 12 generates two coherent, continuous beams 15, 17 of monochromatic radiation. The frequency difference between the radiation beams 15, 17 is adjusted by tuning means 14 to equal substantially the vibrational frequency of a preselected constituent of material. Projecting means 16 directs the radiation beams 15, 17 through the material to produce scattered radiation 20 containing a detectable signal 22 composed of an anti-Stokes component generated coherently during scattering. A filtering means 23 receives the scattered radiation 20 and selectively separates the signal 22 therefrom. The resultant signal 22 from the filtering means 23 is displayed by the indicating and recording means 66.

Having thus described the invention in rather full detail, it will be understood that these details need not be strictly adhered to but that various changes and modifications may suggest themselves to one skilled in the art, all falling within the scope of the present invention as defined by the subjoined claims.

We claim:

1. Apparatus for spectroscopic material analysis, comprising:
   a. radiation source means for generating two coherent, continuous beams of low power monochromatic radiation;
   b. tuning means for adjusting the frequency difference between said beams of radiation to equal substantially the vibrational frequency of a preselected constituent of material;
   c. projecting means for directing said beams of radiation through said material to produce scattered radiation containing a detectable signal composed of an anti-Stokes component generated coherently during scattering;
   d. filtering means adapted to receive said scattered radiation and selectively transmit said signal; and
   e. detecting means for indicating the intensity of said signal.

2. Apparatus as recited in claim 1, wherein said radiation source means comprises a dye laser including a dye cell containing a dye material, means for exciting said dye and a laser cavity comprised of an optical element and a partially transmitting output mirror for generating and transmitting laser radiation.

3. Apparatus as recited in claim 2, wherein said dye material emits radiation upon being excited, said radiation having frequencies within the transparency range of said material.

4. Apparatus as recited in claim 1, wherein said tuning means comprises beam splitting means for separating said radiation into a pair of radiation beams, and a pair of diffraction gratings mounted in autocollimation.

5. Apparatus as recited in claim 4, wherein said tuning means further comprises a pair of etalons disposed in series with and between said beam splitting means and said diffraction gratings.

6. Apparatus as recited in claim 5, wherein said diffraction gratings are connected through shaft encoded stepping motors to a control means for varying the rotational velocity of one of said stepping motors relative to the rotational velocity of the other stepping motor.

7. Apparatus as recited in claim 6, wherein said control means is adjusted so that one of the gratings has a frequency scanning rate twice that of the other of said gratings.

8. Apparatus as recited in claim 1, wherein said tuning means comprises an acousto-optic modulator disposed in series with and between said dye cell and a diffraction grating, for effecting electronic generation of said radiation beams.

9. Apparatus as recited in claim 1, wherein said filtering means is a narrow band pass interference filter having its pass band centered at the frequency of said detectable signal.

10. Apparatus as recited in claim 2, wherein said dye laser additionally includes a second dye cell containing a second dye material, means for exciting said second dye material and a second laser cavity comprised of a second optical element and a second partially transmitting output mirror for generating and transmitting laser radiation.

11. Apparatus as recited in claim 10, wherein said dye material of said second cell emits radiation upon being excited, said radiation having frequencies within the transparency range of said material.

12. Apparatus as recited in claim 11, wherein said dye material of said second dye emits frequencies that overlap vibrational stokes spectra produced by said preselected constituent of material during excitation of said constituent with frequencies said radiation from said dye cell.

13. A method for spectroscopically analyzing material comprising the steps of:
   a. generating two coherent, continuous beams of low power, monochromatic radiation;
   b. adjusting the frequency difference between the beams of radiation to equal substantially the vibrational frequency of a preselected constituent of material;
   c. directing the beams of radiation through the material to produce scattered radiation that contains a detectable signal composed of an anti-Stokes component generated coherently during scattering;
   d. filtering the scattered radiation to selectively transmit the detectable signal; and
   e. indicating the intensity of the signal.

14. A method as recited in claim 13 wherein said material is gas.

15. A method as recited in claim 13 wherein said material is a liquid.

16. A method as recited in claim 13 wherein said material is a solid.

* * * * *